Feb. 20, 1940.   A. S. KROTZ   2,191,211
ADJUSTABLE VEHICLE SUSPENSION
Filed Oct. 12, 1937   5 Sheets-Sheet 1
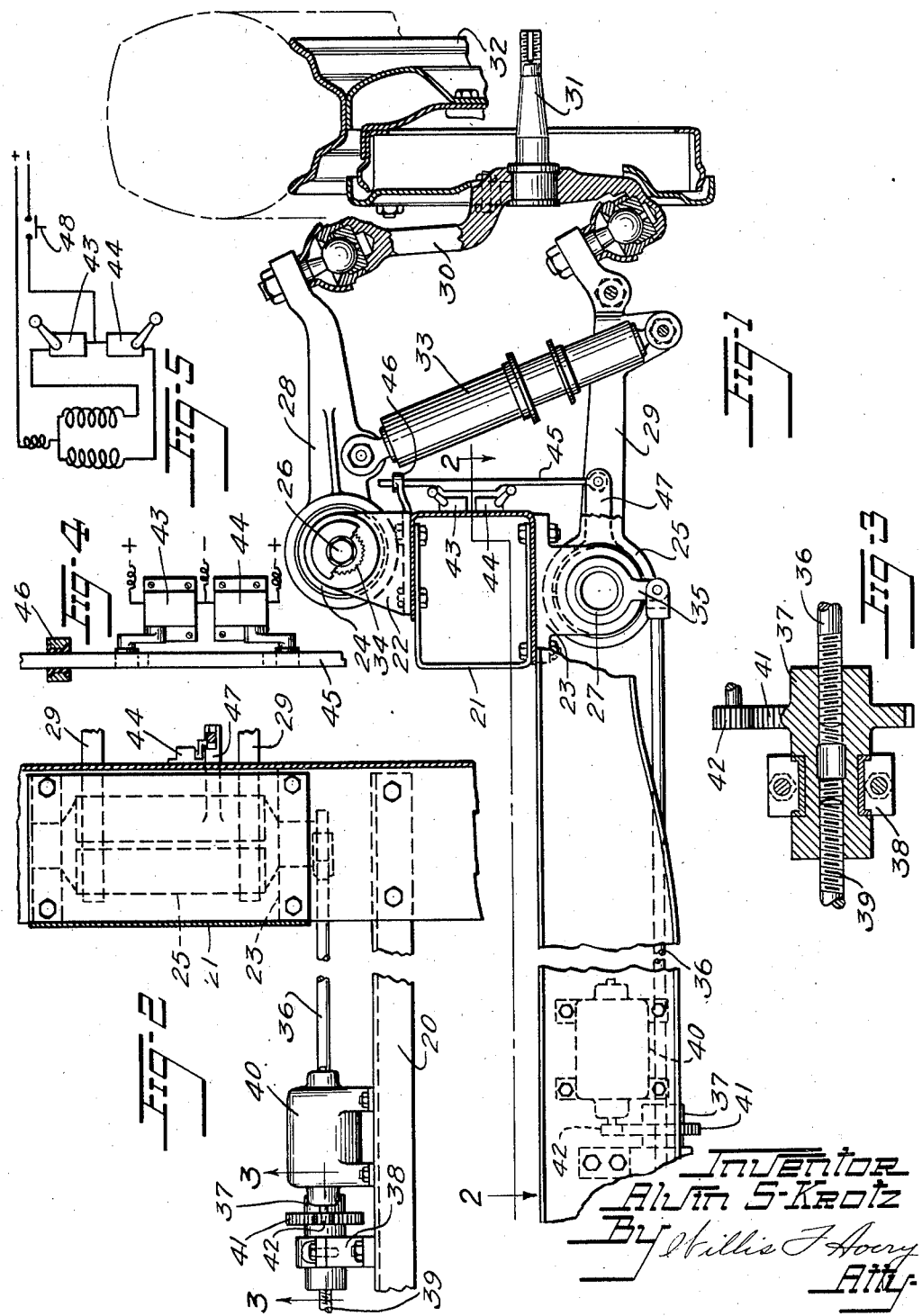
INVENTOR
Alvin S. Krotz
By Willis F. Avery
Atty.

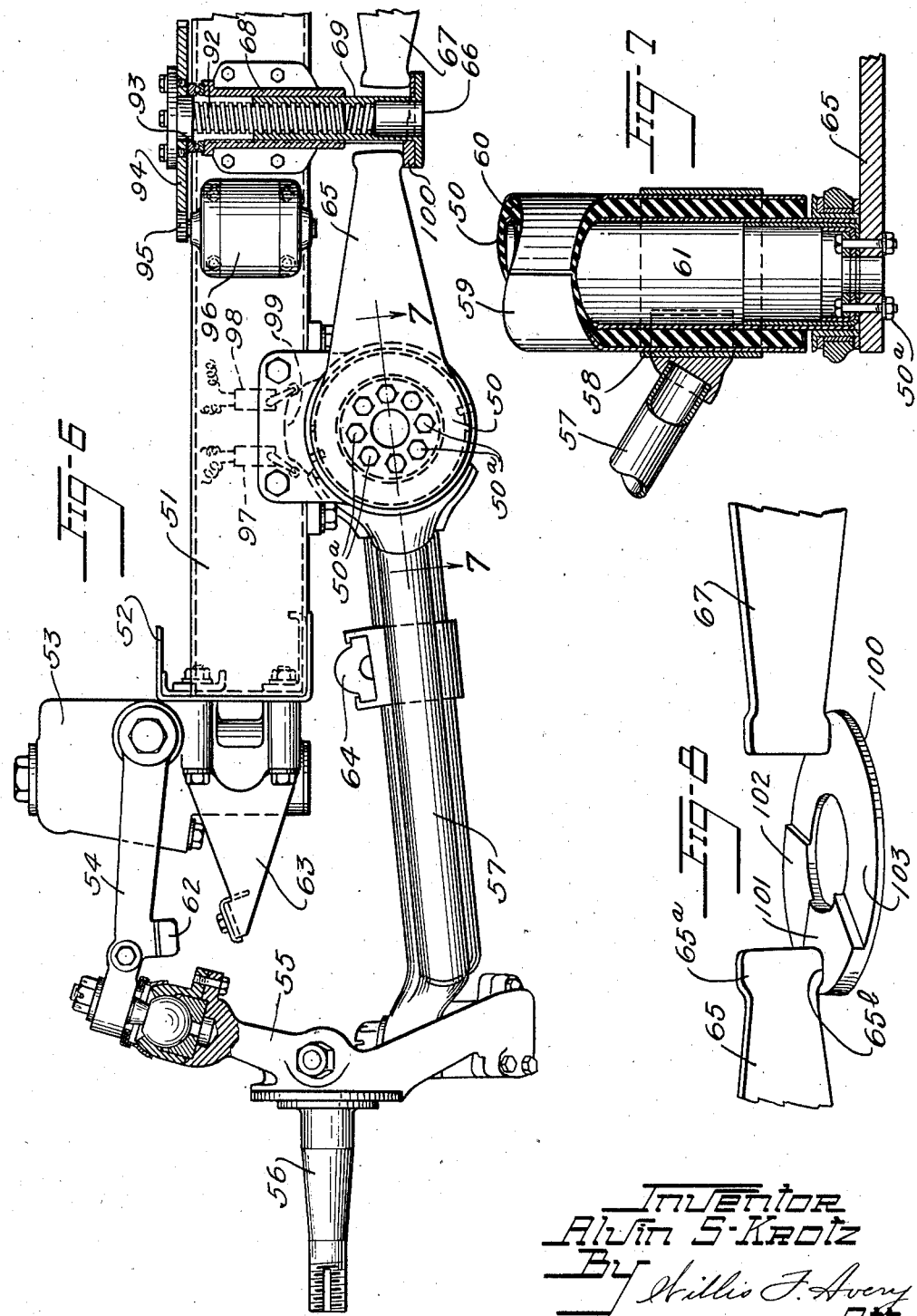

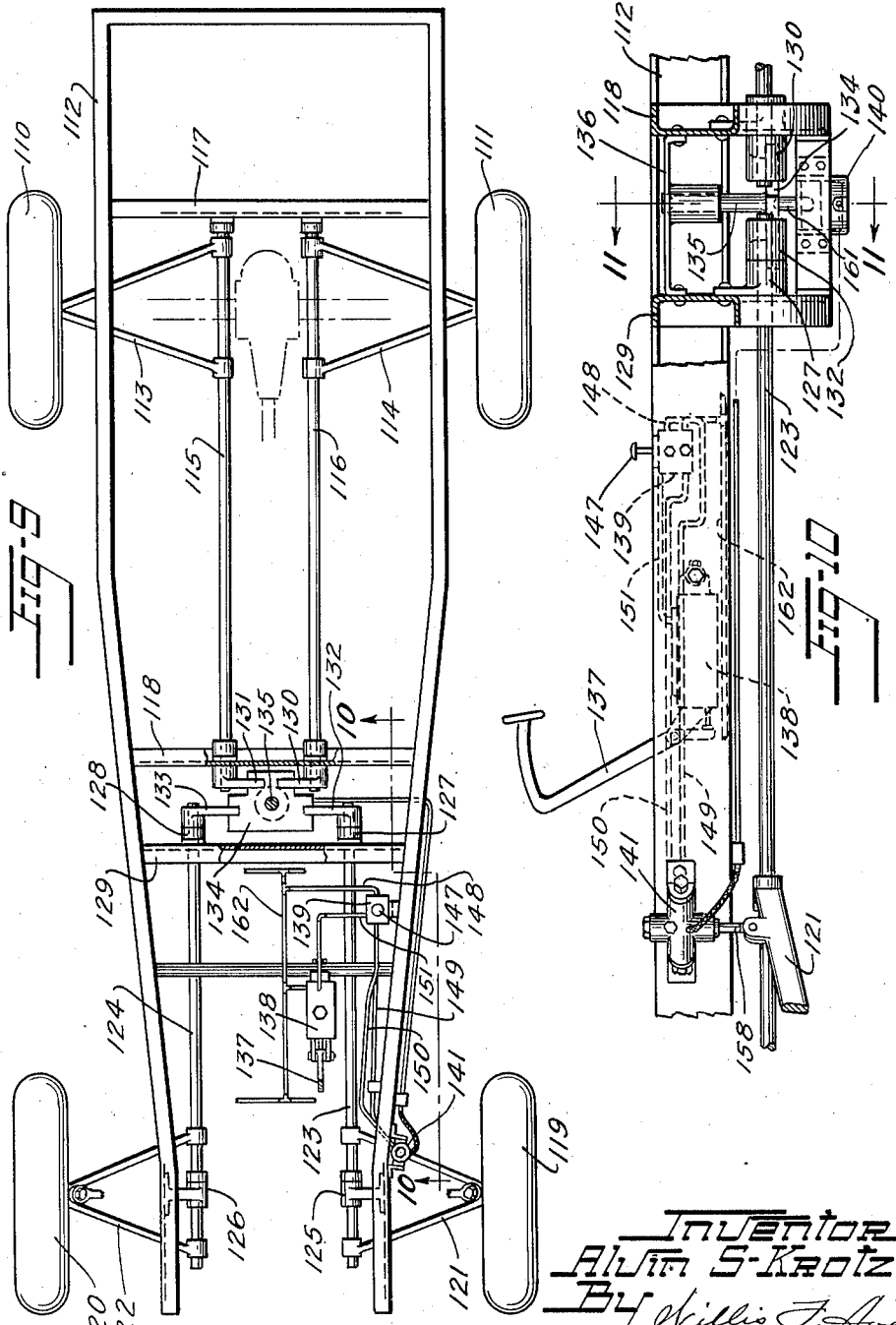

Feb. 20, 1940.  A. S. KROTZ  2,191,211
ADJUSTABLE VEHICLE SUSPENSION
Filed Oct. 12, 1937  5 Sheets-Sheet 4
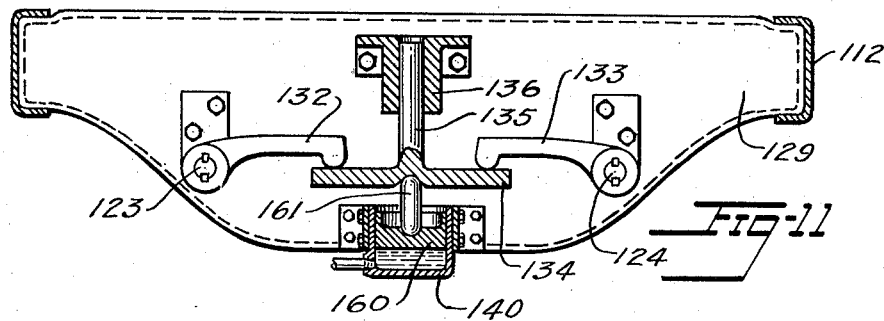
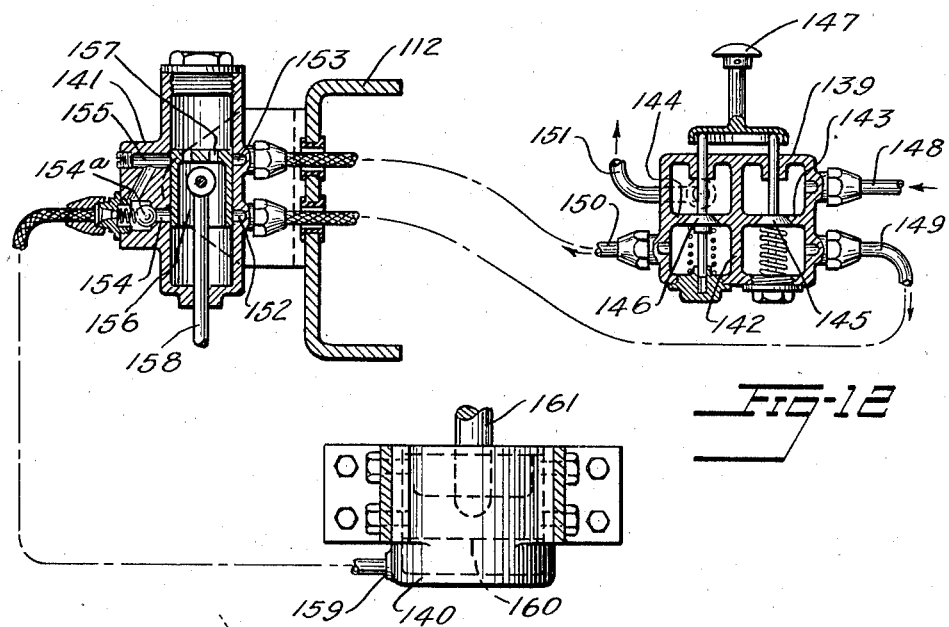
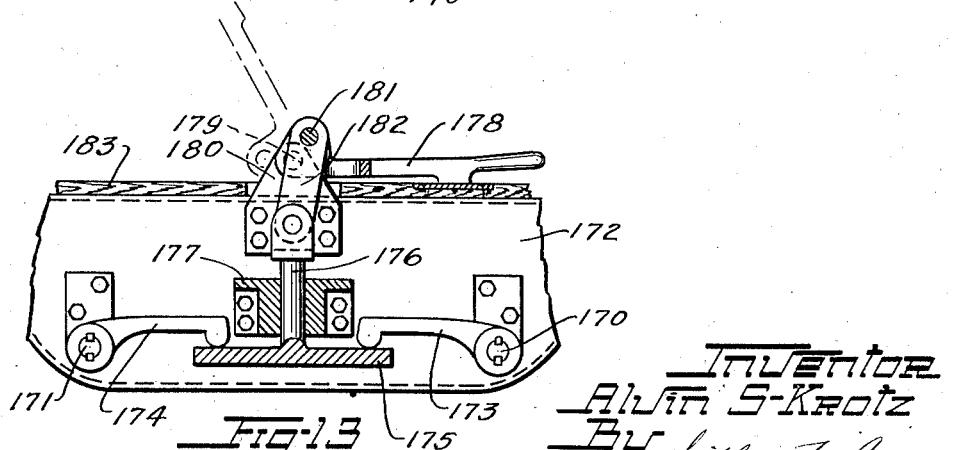
Inventor
Alvin S. Krotz
By Willis F. Avery
Atty.

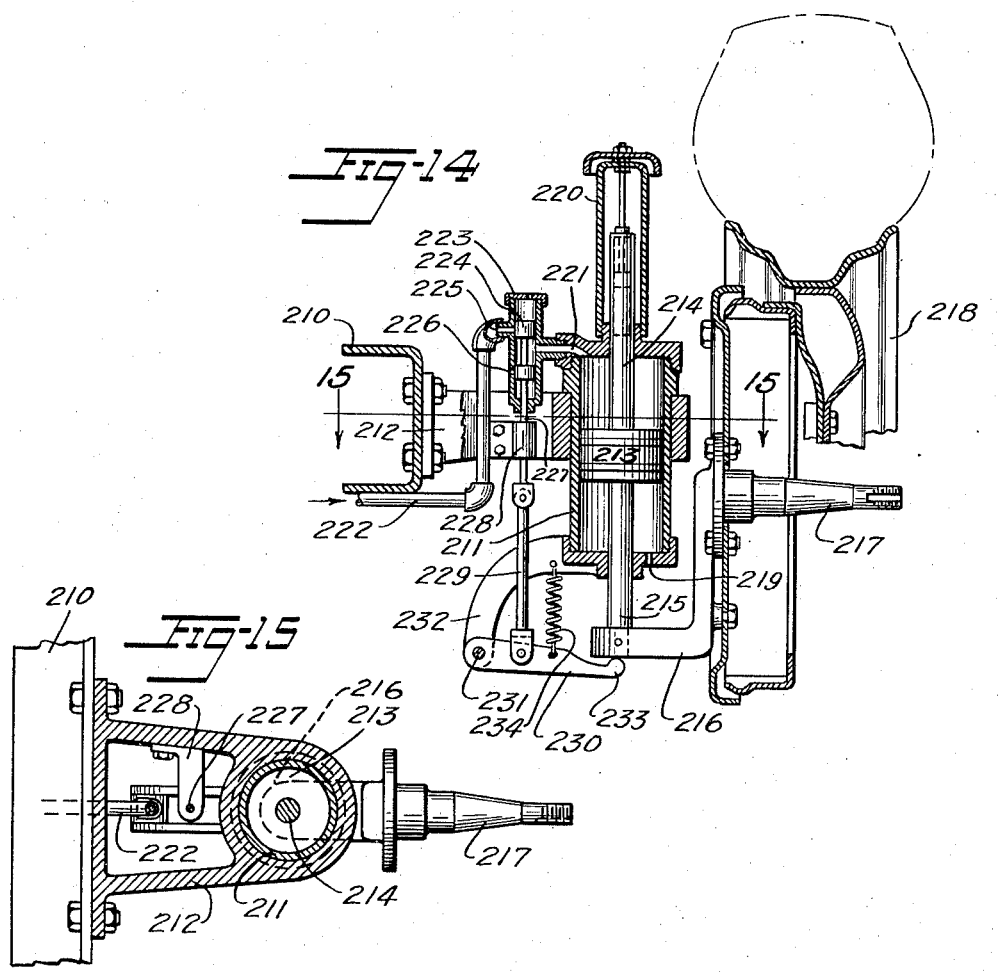
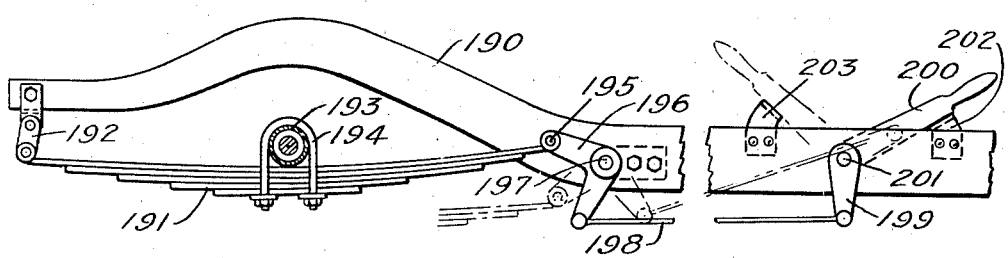

Patented Feb. 20, 1940

2,191,211

UNITED STATES PATENT OFFICE 2,191,211

ADJUSTABLE VEHICLE SUSPENSION

Alvin S. Krotz, Akron, Ohio, assignor to The B. F. Goodrich Company, New York, N. Y., a corporation of New York Application October 12, 1937, Serial No. 168,533

7 Claims. (Cl. 267—21)

This invention relates to suspension systems for vehicles and it is applicable to vehicles generally including passenger automobiles, motor buses, trucks, trailers, and railway cars wherein an elastic suspension system is used for cushioning the movement of the vehicle over the irregularities of road-bed or track.

Some vehicles are operated under considerable variations in load, for example motor buses are operated at times with no passengers or only a few and at other times with a capacity load. Inasmuch as the variation in the amount of load is often a large proportion of the total load on the suspension system there has heretofore been the objection that under maximum load the available range of springing movement has been reduced undesirably, at times even to nothing so that the body of the vehicle has been caused to bump against under structure. It has been necessary in many cases to use excessively stiff springs so that the ride has been uncomfortable, especially at light loads.

The chief objects of the present invention are to provide for maintaining an adequate range of springing movement under all conditions of load by maintaining the vehicle body at a constant or substantially constant height with respect to the wheels; to provide for softness of springing despite large variations in load; to provide for effecting adjustment of the height of the body with respect to the wheels; to provide for effecting such adjustment automatically; to provide for effecting automatic adjustment under control of the operator; to provide for convenient manual operation to effect the adjustment, and to provide sturdiness of construction and reliability of operation.

These and other objects will be apparent from the following description, reference being had to the accompanying drawings in which:

Fig. 1 is a front elevation with parts sectioned and broken away of a front or steering wheel assembly mounted on a body frame and embodying and constructed in accordance with the invention.

Fig. 2 is a view taken along the line 2—2 of Fig. 1.

Fig. 3 is a section taken along the line 3—3 of Fig. 2.

Fig. 4 is an elevation of electrical control mechanism as viewed from the right in Fig. 1.

Fig. 5 is a diagram of the electrical circuit of the operating motor and controls.

Fig. 6 is a front elevation with parts broken away and sectioned of a modified form of suspension embodying and made in accordance with the invention.

Fig. 7 is a section taken along the line 7—7 of Fig. 6.

Fig. 8 is a perspective view of a portion of the structure of Fig. 6.

Fig. 9 is a plan view, with parts broken away and sectioned, of a chassis frame and a further modified form of suspension system embodying and made in accordance with the invention.

Fig. 10 is a view taken along the line 10—10 of Fig. 9.

Fig. 11 is a view taken along the line 11—11 of Fig. 10.

Fig. 12 is an elevation with parts broken away and sectioned, the view being partly diagrammatic, of the pressure-fluid operating and controlling mechanism of Fig. 9.

Fig. 13 is an elevation like Fig. 11 but showing a further modified construction embodying and made in accordance with the invention.

Fig. 14 is a vertical section as seen from the front of a pneumatic suspension embodying and made in accordance with the invention.

Fig. 15 is a view taken along the line 15, 15 of Fig. 14.

Fig. 16 is a vertical section as seen from the side of a still further modified form of suspension embodying and made in accordance with the invention.

The invention in several of its phases is applicable generally to suspension systems whether the wheel assemblies be mounted individually or in pairs or groups. In the embodiment of Fig. 1 the invention is illustrated as applied to an independent suspension of a construction that is described more fully and claimed in my co-pending application Serial No. 111,424, filed November 13, 1936, for Vehicle wheel mounting, wherein the springing is provided by one or more resilient rubber torsion bushing assemblies adapted to transmit supported load by torsional stress on the rubber. In the embodiment of Figs. 1 to 5 an element of the rubber bushing assembly is utilized to vary the height of the vehicle body with relation to the wheels. A transverse frame member 20 of the body carries longitudinal frame member 21, an upper mounting 22 and a lower mounting 23 for a pair of torsion bushing assemblies 24 and 25 each preferably of a construction comprising an outer slitted or otherwise discontinuous sleeve element held radially compressed by the rubber within it upon inner bushing elements 26 and 27. The upper bushing assembly 24 is thus held radially compressed within an eye of an upper link member 28 and the lower bushing assembly 25 is thus held within the eyes of the spaced-apart arm of a wish-bone link member 29. The outer ends of the link members 28 and 29 have ball and socket connections to a member 30 having fixed to it a wheel axle 31 upon which is rotatably mounted a wheel structure 32 and a direct-acting shock absorber 33 may be connected to the link members to act in series with the rubber of at least one of the torsion bushings in a manner more fully described in my co-pending application above-identified.

The upper torsion bushing assembly may be provided with a toothed mounting 34 of its inner element within the support 22 for the purpose of rotatably adjusting the bushing in its mounting to adjust the height of the body with respect to the wheels, this adjustment being one which is adapted to be made in the factory or shop but is not suitable for accomplishment while the vehicle is under load and especially when it is in operation.

In accordance with the present invention I provide in the embodiment of Figs. 1 to 5 for adjusting the bushing while the vehicle is under load, and provision is made for effecting the adjustment automatically as determined by the relative height of the body with respect to the wheels and under control of the operator for rendering the automatic adjusting means effective and ineffective as desired.

To this end I provide the inner element 27 of the lower bushing assembly, which element is rotatable in its mounting support 23, with a lever arm 35 rigidly attached to the forward end of the element. Rotation of the element 27 is resisted and torsional stress on the rubber of the bushing assembly is maintained for supporting the load by means of a tension rod 36 disposed crosswise of the vehicle and pivotally connected at its outer end to the lever arm 35 and having a threaded engagement with a turnbuckle or nut member 37 mounted at an intermediate position upon the frame member 20 for rotation of the nut member 37 within a bearing 38 secured to the frame member. The structure thus far described with the exception of the nut member 37, may be duplicated at the other side of the vehicle and a tension rod 39 of the other assembly may be extended also to have a threaded engagement with this nut member. The nut member and the tension rod 36 and 39 are threaded in opposite directions so that rotation of the nut member moves the tension rods inwardly together or outwardly together. Such movement of the tension rods 36 and 39 causes a rotative movement of the inner element 27 and a corresponding movement of the inner element of the lower bushing at the other side of the vehicle so that the height of the body is changed simultaneously with respect to the two wheel assemblies.

A reversible electric motor 40 provides power means for rotating the nut 37 in both directions to move the tension rods 36 and 39 in and out to effect the height adjustment, the nut 37 preferably being provided with a gear wheel 41 attached to the nut member and meshing with a pinion 42 upon the motor shaft. The motor may be of the series wound type indicated in Fig. 5.

For the purpose of effecting an automatic adjustment of the height of the body with respect to the wheels, as when changes in load occur, a pair of limit switches 43, 44 may be mounted upon the frame member 21 in a position to be operated by a vertically mounted switch-operating cam rod 45. The rod at its upper end may slide in a bearing 46 carried by the frame and at its lower end have a pivotal connection with an arm 47 secured to the outer movable element of the lower bushing assembly so that the arm 47 partakes of the movement of the lower link member 29. As is shown in Fig. 5 the electrical circuit through the motor and the two switches 43 and 44 is such that upon closing of the upper switch 43 the motor is caused to rotate in one direction and upon opening of that switch and closing of the lower switch 44 the motor is caused to rotate in the opposite direction. A button or other manual type switch 48 may be provided in the power line, preferably at a position convenient to the operator of the vehicle, for rendering the automatic height adjusting mechanism operative or inoperative at will.

It will be understood from the foregoing description that normally the switches 43 and 44 are open when the motor 40 is stopped so that the vehicle body is maintained at a determinate normal height with respect to the wheels. Upon increasing the load on the vehicle the body of the latter tends to descend with respect to the cam rod 45 to close the switch 43, whereupon, assuming that the operator has closed switch 48, the nut 37 will be rotated by the motor 40 in the proper direction to exert an additional pull upon the rods 36 and 39 to rotate the inner elements of the lower bushings in the direction to cause elevation of the body with respect to the wheels. This action continues until the body has risen with respect to the cam rod 45 to a position where switch 43 is opened, whereupon, by the stoppage of motor 40 the mechanism is held in the adjusted position so that the normal height of the body with respect to the wheels is maintained constant or approximately constant despite the increased load. Upon relieving the vehicle of load the body tends to ascend with respect to the cam rod 45 until by the closing of switch 44 and the motor 40 rotates nut 37 in the opposite direction and the tension rods 36 and 39 are eased outwardly to permit the body to descend with respect to the wheels until the switch 44 is again opened and the motor stopped so that the height relation of the body and the wheels is again restored.

It will be seen that by this improved construction a large amplitude of springing is maintained despite large variations in load on the vehicle so that there may be effective springing when the vehicle is heavily loaded as well as when the load is light, and softness of spring is made possible despite large load variations. Also, adjustment to overcome the creep or non-elastic yielding of the rubber during use is made possible.

In case a height adjustment of one wheel is desired with respect to the wheel at the opposite side of the vehicle, this may be accomplished by relieving the tension on rods 36 or 39 and adjusting its position in the unit member 37 with relation to the other tension rod. This adjustment permits the overcoming of unequal creeping of the two rubber bushings resulting from non-elastic yielding of the rubber in use and it permits adjustment to level the vehicle laterally.

In the embodiment of Figs. 6 to 8 the suspension system differs somewhat in details from that of Figs. 1 to 5. In this embodiment each wheel assembly is resiliently connected to the frame by a single torsion bushing assembly indicated generally at 50 mounted at the lower side of a transverse frame member 51. A longitudinal frame member 52 supports a shock absorber 53, the operating link 54 of which constitutes the upper link of the wheel suspension. A wheel-supporting steering knuckle member 55 carrying a wheel spindle 56 is pivotally connected to the link 54 at the outer end of the latter and is likewise pivotally connected to the outer end of a wishbone link structure 57, for steering movement. The inner ends of the two arms of the wishbone link 57 are secured as by welding to outer enclosing elements of the rubber bushing assembly, the outer enclosing element being shown at 58. An outer discontinuous sleeve element 59 and a rubber body 60 are held preferably radially compressed upon an inner sleeve element 61, and the rubber preferably is in vulcanized adhesion with the inner and outer sleeve elements 61 and 59.

For limiting upward movement of the body with relation to the wheel the upper link 54 may be provided with a rubber cushion 62 engageable with a bracket 63 secured to the frame, and for limiting downward movement of the body with respect to the wheel the lower link structure 57 may be provided with a rubber cushion 64 engageable with the bottom of the frame.

To enable the rubber bushing assembly to transmit the supported load by torsional stress on the rubber the inner element 61 of the bushing assembly carries at its forward end an arm 65 the end of which rests upon a supporting structure 66 mounted upon the frame.

The wheel assembly at the opposite side of the vehicle may be similarly mounted and an arm 67 of the latter mounting may also rest upon the supporting structure 66, the latter being located at an intermediate position on the frame member 51.

The supporting structure 66 comprises a vertical guide 68 mounted upon the frame member 51 having a vertically movable member 69 splined within it for vertically sliding, non-rotative movement. The member 69 is internally threaded for engagement with a vertically disposed operating screw 92 which is supported for rotation at its upper end as by an anti-friction bearing 93. A gear wheel 94 is mounted for rotation with the screw 92, the gear 94 meshing with a pinion 95 of a reversible driving motor 96. The motor may be operated by switches 97, 98 through an electric circuit similar to that of Fig. 5, the switches 97 and 98 in turn being operated by a cam 99 which may be carried by one of the outer enclosing elements 58 of the bushing assembly so that it swings with the wish-bone link 57 of the wheel mounting. The automatic operation to effect the height adjustment in this embodiment may be the same as that described for the embodiment of Fig. 1.

In the embodiment of Figs. 6 to 8 adjustment of the height of the wheel assembly with respect to the wheel assembly at the opposite side of the vehicle is effected by means of a plate 100 resting upon the flanged bottom end of the member 69. The plate 100 is provided with stepped portions 101, 102, and 103 as shown most clearly in Fig. 8. A number of vertical positions of one of the arms 65, 67 with relation to the other arm may be obtained including, if desired, the same vertical position for both by resting the two arms upon the more extensive portion 103 of the plate. The number of variations in the height adjustment of one wheel assembly with respect to the other may be increased by the provision of an unsymmetrical construction of one or both of the arms 65 and 67 about the longitudinal axis of the arm so that when it is inverted front to back the effective position of the arm is changed. This may be accomplished, for example, by the provision of a greater prominence of the projection 65$^a$ than the opposite projection 65$^b$. For further refinement of the adjustment the arms may be attached to the bushings by means of a plurality of bolts 50$^a$, 50$^a$ permitting many effective positions of the arms to be obtained especially when this adjustment is used in combination with the reversal feature and the stepped plate 100.

In the embodiment of Figs. 9 to 12 provision is made for effecting the adjustment in the height of the body with respect to all four wheels of the vehicle simultaneously even though each wheel is individually sprung. In this embodiment a pressure fluid operated system is provided for effecting the variations in height and provision is made for manual operation by the operator of the vehicle simply by operation of the usual foot brake pedal of an hydraulic brake system.

Rear wheels 110, 111 are mounted for independent springing upon a vehicle frame 112 by means of respective wish-bone arms 113 and 114 secured to springs of the torsion rod type 115 and 116 at the rear ends of the latter. The torsion rods 115 and 116 are positioned longitudinally of the vehicle and are rotatably mounted at their front and rear ends at cross members 117 and 118 of the frame.

Front wheels 119 and 120 are pivotally mounted for steering upon wish-bone arms 121, 122 which are secured to spring torsion rods 123, 124 which are rotatably mounted on the frame 112 at forward bearings 125, 126 and in rear bearings 127, 128 at a cross member 129 of the frame. For resisting rotation of the torsion rods at their ends remote from the wheels the rods have arms 130, 131, 132 and 133 rigidly secured to the rods at such ends. These arms 130 to 133 extend inwardly with respect to the sides of the vehicle and are adapted to rest upon a supporting plate 134. The plate 134 is provided with an upwardly extending guide post 135 slideable in a guide 136 mounted upon the cross members 118 and 129 of the frame whereby vertical movement of the plate 134 causes a corresponding movement of the arms 130 to 133 and a raising or lowering of the vehicle frame with respect to all the wheels simultaneously.

The vehicle is provided with the usual foot brake pedal 137 which operates a conventional hydraulic brake system through a pressure cylinder 138. According to the invention, provision is made for utilizing the pressure fluid of this system for raising and lowering the plate 134 to effect changes in the height of the body with respect to the wheels. To this end a master control valve 139 is provided with fluid connections from the hydraulic brake system to an operating cylinder 140 through an operating valve 141. The master valve 139 comprises a casing divided into two compartments by a vertical wall 142 the compartments of which are divided by valved horizontal partitions 143, 144. Valves 145 and 146 are spring-pressed upwardly to close, and the stems of the valves project upwardly through the casing where they are adapted to be pressed downward together by an operating member 147 which may be positioned to be depressed by the heel of the operator's foot. With reference to Fig. 12, the right-hand compartment of the valve has a pressure fluid inlet 148 and pressure fluid outlet 149 separated by the valve 145. The left-hand compartment has a discharge receiving inlet 150 and outlet 151 leading to the reservoir of the hydraulic brake system.

The operating valve 141 comprises a casing having on its right-hand side, as viewed in Fig. 12, a pressure fluid inlet 152 and a discharge opening 153, and on the left-hand side of the casing a pressure fluid exit 154 and a by-pass passage 155. A piston 156 of a height sufficient to cover all the operations in the middle position shown is provided within the casing and is apertured at 157 in its top face for passage of fluid to the piston. A connecting rod 158 is pivoted at its upper end to the piston and at its lower end to one of the arms of the wish-bone structure 121 so that as the load on the vehicle is changed the piston 156 operates within the chamber of the valve 141.

The operating cylinder 140 is provided with a combination inlet and exit port 159 and has a piston 160 within its casing adapted to transmit the pressure upon the plate 134 to the body of fluid beneath the piston through a connecting link 161 which may be rounded at both ends to set in a corresponding recess in the bottom of plate 134 and the top of the piston 160 to provide for self-alignment.

The inlet 148 of the master valve 139 is connected directly with the pressure line 162 of the hydraulic brake system and the exhaust port 151 is connected to the reservoir of the hydraulic brake system all by suitable piping. Suitable piping connections are provided between the ports of the master valve 139, the operating valve 141 and the operating cylinder 140 all as shown in Figs. 9, 10 and 12.

The operation of the system is as follows: Assuming the positions of the parts as shown in Fig. 12 to be the positions for the normally desired height of the vehicle body with respect to the wheels, if now the load on the vehicle is materially increased the body will be caused to descend with respect to the wheels, whereupon the cylinder of the operating valve 141 will be caused to descend with respect to the piston 156 thereby opening ports 152 and 154 to the interior of the cylinder and maintaining the two upper ports 153 and 155 closed by the sidewall of the piston. If now the operator depresses the brake pedal normal operation of the brakes will follow but operation of the cylinder 140 will not occur because the master valve 139 remains closed, the springs of these valves maintaining these valves closed. If, however, the operator depresses the member 147 of the master valve 139 the valve 145 will be opened, along with valve 146, and if the brake pedal is then operated pressure fluid will be admitted beneath the piston 160 of the operating cylinder 140 through the right-hand chamber of the master valve 139 and thence through the bottom ports 152 and 154 of the operating valve 141 to the operating cylinder 140. The operator may push upon the brake pedal 137 until the body has been raised to the desired extent or until piston 156 against assumes the position of Fig. 12 whereupon the passage of the pressure fluid to the operating cylinder 140 will be closed and the body will remain at that height. A ball check valve 154ª may be provided to maintain the pressure beneath the piston 160 despite surges in the line.

If the vehicle body is raised with respect to the wheels, as because of a decrease in the load, the casing of the operating valve 141 will be caused to rise with the frame whereupon the piston 156 will assume a low position with relation to the cylinder thereof, whereupon the upper ports 153 and 155 will be opened while the lower ports are maintained closed. If the operating member 147 of the master valve 139 is then depressed pressure fluid will be exhausted from beneath the piston of the operating cylinder 140 and will be caused to flow through the by-pass 155, the discharge port 153 and through the left-hand chamber of the master control valve 139 back into the reservoir of the hydraulic brake system, through ports 150 and 151, whereupon the body will be caused to drop until the parts of the operating valve 141 again assume the positions of Fig. 12, whereupon the body will be maintained at that height because the fluid beneath the piston 160 has no further escape.

Because of the large mechanical advantage afforded by the fluid pressure system of the hydraulic brake system relatively small effort of the operator upon the brake pedal 137 is required to raise the body of the vehicle, this arrangement is well suited especially to vehicles like small motor buses and passenger automobiles where the load is not excessively large but is changed frequently by the getting on and off of the passengers in groups, and the change in load is a large portion of the total load.

The embodiment of Fig. 13 is adapted especially for vehicles where the load is changed infrequently but in a large proportion of the total load as for example in some trucking operations where the truck is usually either heavily loaded or empty and in passenger automobiles. The two-position adjustment is suitable for many such applications. This embodiment is illustrated in Fig. 13 as applied to a torsion bar suspension of the construction above described for Fig. 9, two of the torsion bars being illustrated in Fig. 13 at 170, 171 the bars being pivotally mounted in a transverse frame member 172 of the vehicle. Lever arms 173, 174 are mounted at the ends of the tension rods 170 and 171 and are adapted to bear against the supporting plate 175 having an upwardly projecting guide post 176 slidable within a guide 177 mounted upon a frame member An over-center linkage is provided for maintaining the supporting plate 175 either in a lower position for light loads or in an upper position for heavy loads. This linkage may comprise an operating handle 178 having a lower end of a bell-crank form pivoted at 179 to a bracket 180 mounted on the frame and pivoted at 181 to a link 182 which is pivoted at its lower end to the top of the guide post 176. The arrangement is such that by the over-center arrangement of the pivots the handle is held either in the full line position in which the supporting plate 175 is held up for maintaining the vehicle body at the desired height under heavy loads, or the handle may be swung to the broken line position wherein the pivots are over-center in the other direction so that the plate 75 is maintained in its lower-most position for light loads on the vehicle. If desired, the arrangement may be such that the handle 178 extends through the floor 183 of the vehicle in a position to be operated conveniently by the driver.

Referring now to the embodiment of Fig. 16, a construction is illustrated in which a two-position adjustment is provided for a suspension of the leaf spring type and provision is made for effecting the adjustment from a position remote from the wheel and spring assembly. A vehicle frame 190 has connected to it at its rear end a leaf spring assembly 191 mounted by means of a conventional shackle 192, the spring being connected at its central point to the rear axle housing 193 by means of one or more straps 194. At its forward end the leaf spring 191 is pivoted at 195 to a rearwardly extending arm of a bell crank lever 196 pivoted to the frame at 197. A connecting rod 198 is pivoted to the other arm of the bell crank which extends downward and the other end of the rod 198 is pivoted to an arm 199 of a bell crank handle lever 200, said lever being pivoted to the frame at 201. The arrangement is such that in the full line position shown, which is for light loads, the spring 191 is held in a raised position with respect to the frame and when the lever 200 is swung to the open line position the spring is moved to its lower position, or in other words, the body of the vehicle is caused to be raised with respect to the wheels. The parts are maintained in each of the two positions by the over-center relationship of the rod 198 with respect to the pivot 201 Suitable abutments 202 and 203 may be provided for the two positions of the lever 200. This construction makes possible the manipulation of the rear spring of the vehicle by operation at a position near the drivers seat at the front of the vehicle. It will be understood that the construction described may be duplicated on other wheels of the vehicle and if desired they may be all operated conjointly by a single operating lever.

In the embodiment of Figs. 14 and 15 provision is made for a pneumatic spring suspension and for automatically controlling the height of the body with respect to the wheels. In this embodiment a frame member 210 supports a pneumatic spring cylinder 211 by means of an outwardly extending bracket structure 212. Within the cylinder 211 is disposed a piston 213 having upper and lower guide rods 214 and 215 extending through the ends of the cylinder and providing guided vertical motion of the piston and cylinder with respect to each other. The lower piston rod 215 has secured to it at its lower-most end an arm structure 216 which carries a wheel spindle 217 for supporting a wheel assembly 218. Springing is effected by a confined body of air above the piston 213 within the cylinder and the space in the cylinder beneath the piston 213 preferably is vented as at 219. If desired, a shock absorber 220, which may be of the direct-acting type, may be associated with the upper piston rod 214. For admitting compressed air to the cylinder space above the piston 214, and for exhausting air therefrom, the cylinder is provided with a port 221. Compressed air is supplied through a pipe line 222.

For the purpose of providing an automatic adjustment of the height of the vehicle body with respect to the wheels a valve assembly 223 is interposed between the supply line 222 and the port 221. The operation of this valve being controlled by the height of the body with respect to the wheels. To this end the valve 223 is provided with a double-ended piston valve 224 arranged so that the space between the piston ends is always in communication with the cylinder port 221. The supply line 222 is in connection with the valve through a port 225 adapted to be opened and closed by the upper piston portion. A venting port 226 is provided in the wall of the valve casing in a position to be opened and closed by the lower valve end. A rod 227 of the piston 224 extends through the bottom of the valve body and through a guide 228 mounted on bracket 212. A connecting rod 229 is pivoted to the lower end of the rod 227 and to a lever 230 which is pivoted at 231 to a bracket 232 secured to cylinder 211 and has its free end 233 engaging the bottom end of the lower rod 215 of the piston 213. A tension spring 234 connected to the lever 230 and to the bracket 232 maintains such engagement.

The operation of the construction above described for Figs. 14 and 15 is as follows: Assuming the parts shown to be in their positions for the normal desired height of the body with respect to the wheels the supported load is transmitted through the body of compressed air retained in the cylinder space above the piston 213. If the load on the vehicle is increased the cylinder 211 along with the frame 210 of the vehicle body will tend to descend with respect to the wheel. As a result of this the lever 230 will be caused to swing upwardly about its pivot 231 thereby urging upwardly the valve piston 224 within the valve casing until the port 225 of the supply line is put into connection with the port 221 of the operating cylinder through the intermediate space between the two portions of the piston 224. The admission of the compressed air from the supply line into the cylinder space above the piston 213 causes the body to be raised with respect to the wheels until the position of the parts as shown in Fig. 14 is restored whereupon when valve piston 224 has closed the port 225 the height of the body for that load will be maintained with respect to the wheels.

If there is a material decrease in the load on the vehicle the cylinder casing 211 will tend to rise with respect to the piston 213 whereupon the lever 230 will be caused to swing downward about its pivot 231 to move the valve piston 224 downward in its casing until the vent port 226 is put in connection with the cylinder port 221 so that air is vented from the operating cylinder until the cylinder casing 211 along with the vehicle body is caused to descend with respect to the piston 213. The descent continues until the valve piston 224 has been returned to the position of Fig. 14 where by the operation of lever 230 the vent port 226 is again closed.

From the foregoing description of the several illustrated embodiments of the invention it will be seen that many of the phases of the invention are applicable to suspensions generally whether they be of mechanical or pneumatic-spring operation or other type, and that the control of the height of the body with respect to the wheels may be effected electrically, hydraulically, pneumatically and even manually. Also the operation may be fully automatic, it may be automatic under manual control or the operation may be effected manually.

Variations may be made without departing from the invention as it is defined in the follow claims:

I claim:

1. A vehicle suspension comprising a plurality of wheel assemblies, a supported structure, mounting means connecting the supported structure and wheel assemblies comprising a plurality of arm structures adapted to transmit supported load, and means mounted on the supported structure cooperating with said arms to transmit load thereto, the load transmitting means comprising means for adjusting the vertical position of one wheel assembly with respect to the other including an adjustable plate member having stepped surface portions engageable with said arm structures.

2. A vehicle suspension comprising a wheel assembly, a supported structure, springing means between the wheel assembly and supported structure comprising inner and outer relatively rotatable elements connected one to the wheel assembly and the other to the supported structure, a body of rubber-like material mounted radially between said elements to effect springing by torsional stress on said body, and power means and a control therefor operable from the supported structure while the wheel assembly is under load for rotatively adjusting one of said elements to vary the relative vertical positions of the wheel assembly and said structure.

3. A vehicle suspension comprising a wheel assembly, a supported structure, springing means between the wheel assembly and supported structure comprising inner and outer relatively rotatable elements connected one to the wheel assembly and the other to the supported structure, a body of rubber-like material mounted radially between said elements to effect springing by torsional stress on said body, and means controlled at least in part by the height of said structure with respect to the wheel assembly for rotatively adjusting the elements connected to said structure with respect thereto for maintaining the height of said structure with respect to the wheel assembly approximately constant upon changing the amount of load on the vehicle.

4. A vehicle suspension comprising a wheel assembly at each side of the vehicle, a supported structure, respective springing means between each wheel assembly and the supported structure each comprising inner and outer relatively rotatable elements, one of said elements of each springing means being connected to its wheel assembly and the other of said elements being rotatively mounted upon the supported structure, a body of rubber-like material mounted between said elements of each springing means to effect springing by torsional stress on the rubber, an arm on each springing means extending from the element that is mounted upon said structure, and means on said structure common to both arms for adjusting them and their connected elements of the springing means simultaneously to vary the vertical position of said structure with respect to both wheel assemblies together.

5. A vehicle suspension as defined in claim 4 in which the adjusting means common to both arms comprises means for adjusting the arms independently and power means for adjusting the arms together.

6. A vehicle suspension comprising a wheel assembly, a supported structure, a springing bushing between the wheel assembly and supported structure, said bushing comprising inner and outer elements and a body of rubber-like material mounted radially between said elements to effect springing by torsional stress on said body, means connecting one of said elements to the wheel assembly, means on said structure for supporting the other of said elements and permitting rotative adjustment of the whole bushing, and power means on said structure operable while the wheel assembly is under load for rotatively adjusting the bushing to vary the relative vertical positions of the wheel assembly and said structure.

7. A vehicle suspension comprising a supported structure, a wheel assembly at each side thereof, respective mounting means connecting the supported structure and each wheel assembly, each comprising an arm structure adapted to transmit supported load, and means mounted on the supported structure common to both arm structures for transmitting supported load to said arm structures, the last-mentioned means being adjustable to vary the vertical position of the supported structure simultaneously with respect to both wheel assemblies through said arm structures and adjustable to vary the vertical position of a wheel assembly with relation to the other.

ALVIN S. KROTZ.